United States Patent [19]

Shioi et al.

[11] Patent Number: 4,525,215
[45] Date of Patent: Jun. 25, 1985

[54] INK COMPOSITION

[75] Inventors: Keiko Shioi; Mikihiko Nakanishi, both of Osaka, Japan

[73] Assignee: Sakura Color Products Corp., Osaka, Japan

[21] Appl. No.: 604,314

[22] Filed: Apr. 25, 1984

[30] Foreign Application Priority Data

Apr. 25, 1983 [JP] Japan .................................. 58-73641

[51] Int. Cl.$^3$ ............................................ C09D 11/00
[52] U.S. Cl. ........................................ 106/22; 106/32; 8/638
[58] Field of Search .................... 106/22, 32, 20; 8/638

[56] References Cited

FOREIGN PATENT DOCUMENTS 903724 8/1962 United Kingdom .

Primary Examiner—Lorenzo B. Hayes
Assistant Examiner—Amelia B. Yarbrough
Attorney, Agent, or Firm—Wenderoth, Lind & Ponack

[57] ABSTRACT

An ink composition for writing on an absorbent or pervious writing surface to form thereon a writing or marking composed of an inner portion of a first color with outer contour portions therearound of a second color, which composition comprises:
- a polar organic solvent,
- a nonpolar organic solvent which is miscible with the polar organic solvent,
- a first dyestuff which is soluble both in the polar organic solvent and a mixture of the polar organic solvent and the nonpolar organic solvent, but which is insoluble in the nonpolar organic solvent, and
- a second dyestuff which is soluble both in the nonpolar organic solvent and a mixture of the polar organic solvent and the nonpolar organic solvent, the second dyestuff being different in color from the first dye-stuff, whereby the first dyestuff forms in conjunction with the second dyestuff the inner portion of the first color based on the first and the second dyestuffs, and the second dyestuff forms the outer contour portions of the second color based on the second dyestuff around the inner portion.

9 Claims, No Drawings

INK COMPOSITION

The present invention relates to an ink composition for writing on an absorbent or pervious writing surface to provide a writing or marking composed of an inner portion of a first color with outer contour portions therearound of a second color enclosing the inner portion.

Various color ink compositions, water-base or solvent-base, have been in use for providing a writing or marking on a writing surface. However, such a conventional writing has a single color based on one or more of pigments or dyestuffs incorporated in the ink composition.

There is recently disclosed an ink composition which when applied to an absorbent or pervious writing surface to provide on the surface a polychromatic writing or marking. In Japanese Patent Disclosure No. 57-111364 is disclosed an ink composition which comprises a solvent, at least one of a dyestuff and a finely divided pigment, inorganic or organic, and a metal powder pigment, wherein the dyestuff is dissolved in the solvent, the finely divided pigment is dispersed in the solvent and has a particle size sufficiently small so as to substantially permeate or be absorbed into an absorbent or pervious writing surface, and the metal powder pigment is dispersed in the solvent wherein the pigment has a particle size sufficiently large so as to substantially not permeate or be absorbed into the absorbent or pervious writing surface.

Therefore when the ink composition is applied to the writing surface, the metal powder pigment forms an inner portion of a first color of a writing or marking on the surface, while the dyestuff or the finely divided pigment permeates or is absorbed together with the solvent into the writing surface and diffuses into the area on the writing surface proximate to the inner portion, thereby the dyestuff or the finely divided pigment forms the outer contour portions around the inner portion.

A further ink composition is disclosed in Japanese Patent Disclosure No. 59-6271. The ink composition typically includes a solvent, a first pigment such as a metal powder pigment dispersed in the solvent, a second pigment also dispersed in the solvent, but smaller in the particle size than in the first pigment, and a dyestuff dissolved in the solvent. Therefore, when the ink composition is applied to an absorbent or pervious writing surface, the first pigment is trapped on the surface to form an inner portion of a writing on the writing surface, the second pigment permeates or diffuses into the writing surface to some extent together with the solvent in the area on the writing surface proximate to the writing to form intermediate contour portions around the inner portion, and the dyestuff permeates or diffuses into the outside area on the surface proximate to the intermediate contour portions to form the outermost contour portions therearound.

The conventional ink compositions for polychromatic writing include, as explained above, powdery pigments which are insoluble, and consequently are dispersed in a solvent used, so that when the ink composition is left standing, such powdery pigments deposit in the ink composition to make the composition nonuniform. Therefore, when such an ink composition is contained in a marking pen, for example, with which a writing is formed, it is necessary to shake the marking pen so as to uniformly disperse the pigments in the composition before writing therewith. The pigments further may cause the clogging of a writing tip to prevent the smooth supply of the ink composition with the tip end, thereby to make a writing formed blurred and indistinctly dichromatic.

Furthermore, such conventional ink compositions as above have a further disadvantage is that the structure of a marking pen in which the composition is contained is complicated. A conventional marking pen which forms a monochromatic writing based on solvent-soluble dyestuffs is provided in a tubular holder with an ink reservoir having a continuously porous structure composed of, such as felt, foamed polyurethane, bundle of fibers or sintered resin powder, and the reservoir is impregnated with an ink composition. However, when such an ink reservoir is applied to such a polychromatic ink composition as is explained above, the powdery pigment is adsorbed on the porous structure of the reservoir, and thus, the conventional marking pen for writing a polychromatic writing has a complicated holder structure so as to connect the holder with a writing tip. That is, the holder which contains the composition therein has at the top thereof a connector mounted, which is provided with valvelets to supply the composition with the writing tip end only when the composition is applied to a writing surface. This makes the production steps of such a marking pen complicated and the production cost high.

It is therefore an object of the present invention to provide an ink composition for writing on an absorbent or pervious writing surface to form thereon a writing or marking composed of an inner portion of a first color with outer contour portions of a second color, and in particular, to provide such an ink composition which includes no powdery pigment, but includes dyestuffs dissolved therein, so that the composition is uniform and need not to be shaked before writing but also may not clog a writing tip after standing. It is also an object of the invention to provide a marking pen for writing such a polychromatic writing, in which a conventional continuously porous structure is provided with as a reservoir for such an ink composition.

An ink composition of the invention for writing on an absorbent or pervious writing surface to form thereon a writing or marking composed of an inner portion of a first color with outer contour portions therearound of a second color, which composition comprises:

a polar organic solvent, a nonpolar organic solvent which is miscible with the polar organic solvent, a first dyestuff which is soluble both in the polar organic solvent and a mixture of the polar organic solvent and the nonpolar organic solvent, but which is insoluble in the nonpolar organic solvent, and a second dyestuff which is soluble both in the nonpolar organic solvent and a mixture of the polar organic solvent and the nonpolar organic solvent, the second dyestuff being different in color from the first dyestuff, whereby the first dyestuff forms in conjunction with the second dyestuff the inner portion of the first color based on the first and the second dyestuffs, and the second dyestuff forms the outer contour portions of the second color based on the second dyestuff around the inner portion.

The polar solvent used in the ink composition of the invention includes a 1-8 carbons monohydric aliphatic alcohol, alicyclic alcohol and aromatic alcohol, a 4-10 carbons aliphatic carboxylic acid alkyl ester, alicyclic carboxylic acid alkyl ester and aromatic carboxylic acid alkyl ester, a 3-10 carbons aliphatic alkyl ketone, alicyclic ketone and aromatic ketone, a 2-10 carbons polyhydric alcohol monoether and a 2-10 carbons polyhydric alcohol monoester. The polar solvent has a boiling point preferably of about 70°-250° C. Thus only for examples, a lower aliphatic alcohol such as ethanol, isopropanol or butanol, a lower aliphatic carboxylic acid lower alkyl ester such as ethyl acetate, butyl acetate, butyl propionate or amyl acetate, an alicyclic ester such as cyclohexyl acetate, an aromatic ester such as benzyl acetate, an aromatic acid alkyl ester such as methyl benzoate, and an lower alkyl ketone such as methyl ethyl ketone or methyl isobutyl ketone, an alicyclic ketone such as cyclohexanone or ethylcyclohexanone, and an aromatic ketone such as acetophenone, and a polyhydric alcohol monoether and monoester such as ethyleneglycol monomethylether, monoethylether or monoacetate, and a mixture of two or more of these.

A polyhydric alcohol such as glycerine, ethyleneglycol, propyleneglycol, diethyleneglycol or dipropylene glycol may be used together with the polar solvent. Such a polyhydric alcohol serve to lower the loss of volatile components due to the evaporation thereof in the ink composition.

The nonpolar solvent used in the invention is at least one member selected from the group consisting of a 6-12 carbons aromatic hydrocarbon, alicyclic hydrocarbon and aliphatic hydrocarbon, and such a nonpolar hydrocarbon solvent has preferably a boiling point of about 70°-250° C. Thus for illustrative purposes only, an aromatic hydrocarbon such as benzene, toluene and xylene, alicyclic hydrocarbons such as cyclohexane, methylcyclohexane, ethylcyclohexane and dimethylcyclohexane, and an aliphatic hydrocarbon such as n-hexane, n-heptane and n-octane are preferably used as the nonpolar organic solvent.

The ink composition of the invention includes a first dyestuff and a second dyestuff both dissolved in a mixture of the abovesaid polar organic solvent and the nonpolar organic solvent, and may further contain a resin and other additives when desired, as described later.

The first dyestuff is defined as a dyestuff which is soluble both in the polar organic solvent and in a mixture of the polar and the nonpolar organic solvents, the mixture being a vehicle of the ink composition of the invention, but is insoluble in the nonpolar organic solvent. Therefore, either a water-soluble dyestufff or a spirit-soluble dyestuff is preferably used as the first dyestuff since it is readily soluble in the polar organic solvent as above. The second dyestuff is in turn defined as a dyestuff which is soluble both in the nonpolar solvent and in a mixture of the polar and the nonpolar organic solvents, and which further has a color different from that of the first dyestuff. Therefore, an oil-soluble dyestuff is preferably used as the second dyestuff since it is readily soluble in the nonpolar solvent as above. However, it is not required that the second dyestufff is soluble in the polar organic solvent, that is, the second dyestuff may or may not be soluble in the polar organic solvent.

Only for illustrative purposes only, preferable dyestuffs used as the first dyestuff are water-soluble ones such as C.I. Acid Red 73, 87 and 94, C.I. Acid Yellow 23, C.I. Acid Blue 7 and 9, C.I. Acid Violet 49, Acid Orange 56, C.I. Direct Red 39, C.I. Direct Black 19 and 154, C.I. Direct Orange 6, C.I. Direct Yellow 8 and 85, and C.I. Direct Blue 71, and spirit-soluble dyestuffs such as C.I. Solvent Red 7 and 91, C.I. Solvent Brown 28, C.I. Solvent Blue 2, Vari First Red 1308 and Vari First Blue 1603 (both by Orient Kagaku Kogyo K.K.), Spilon Red CGH and Spilon Violet CRH (both by Hodogaya Kagaku Kogyo K.K.).

Some preferable examples of the second dyestuff are C.I. Solvent Black 3 and 27, C.I. Solvent Red 18 and 24, C.I. Solvent Blue 2, 55 and 105, Oil Yellow 105, Oil Pink 312 and Oil Orange (the last three by Orient Kagaku Kogyo K.K.).

However, the first and second dyestuffs usable in the present invention are not restricted to the examples as above, but are selected depending on the individual solvents used and the amounts thereof.

According to the present invention, the polar organic solvent, one component of a vehicle of the ink composition, has a larger interaction with the fibrous network of an absorbent or pervious writing surface such as paper or cloth because of its polar functional group or groups such as, for example, hydroxyls, and has a greater affinity to the fibrous writing surface than the nonpolar organic solvent. Therefore, the polar organic solvent is less permeable or diffusable into the writing surface, whereas the nonpolar organic solvent is more readily permeable and diffusable into the writing surface. Therefore, when the ink composition of the invention is applied to an absorbent or pervious writing surface, since the first dyestuff is soluble in the polar organic solvent but is insoluble in the nonpolar organic solvent, the first dyestuff only slightly permeates and diffuses into the writing surface together with the polar organic solvent, and is fixed on the writing surface substantially along the writing on the writing surface.

A polyhydric alcohol monoalkyl ether, in particular, a polyalkylenglycol monoalkyl ether such as a monoalkyl ether of ethyleneglycol, propyleneglycol, diethyleneglycol or dipropylene glycol is most preferably used as the polar organic solvent since it is able to dissolve therein the first dyestuff in a greater amount but also it has a relatively large viscosity, and as a whole, a greater affinity to an absorbent or pervious writing surface. Therefore, the ink composition is substantially not diffusable into the writing surface and is fixed substantially along the writing with the first dyestuff, which then forms a distinct inner portion of the writing. The polyhydric alcohol monoalkyl ether may be used either as a single polar solvent or with other polar solvents.

On the contrary to the above, the second dyestuff which is soluble in the nonpolar organic solvent may in part form the inner portion in conjunction with the first dyestuff, but the residual diffuses and permeates into the writing surface together with the nonpolar organic solvent to reach the outside area on the writing surface proximate to the inner portion of the writing, thereby to form outer contour portions of the writing of a second color around the inner portion. Therefore, as will be apparent, the inner portion of the writing has a mixed color based on the first and the second dyestuffs, whereas the outer contour portions have a single color based on the second dyestuff.

Although the amount of each of the dyestuffs in the ink composition is dependent upon the individual dyestuffs and the solvents used, and the intended color depth of the inner portion, and on the other hand the amount of each of the solvents is dependent upon the intended width of the outer contour portions of the writing, the ink composition of the invention usually includes 2-50% by weight, preferably 5-35% by weight of the polar solvent, 40-95% by weight, preferably 50-90% by weight of the nonpolar solvent, 0.05-10% by weight, preferably 0.1-5% by weight of the first dyestuff, and 0.05-10% by weight, preferably 0.1-5% by weight of the second dyestuff, based on the ink composition, respectively.

When the ink composition contains relatively too large an amount of the polar organic solvent, the amount of the second solvent and the second dyestuff dissolved therein is relatively too small so that the second dyestuff fails to reach the outside area on the writing surface to proximate to the inner portion, that is, the ink composition provides only a unclear and indistinct dichromatic writing. When the ink composition contains relatively too small an amount of the polar organic solvent, it also forms a vague dichromatic writing because of too small an amount of the first dyestuff in the ink composition. On the other hand, when the ink composition contains relatively too large an amount of the nonpolar organic solvent, the composition has too small a viscosity, resulting in bad writing, while when the ink composition contains relatively too small an amount of the nonpolar solvent, the composition has too large a viscisity, resuting in bad writing but also vague and indistinct dichromatic writing.

The ink composition of the invention preferably contains a resin in amounts not more than 30% by weight, preferably 5-20% by weight, based on the ink composition, so as to have a viscosity suitable for writing therewith. Any resin may be used when it is soluble in the organic solvents used, however, some examples preferably used are a natural resin such as rosin, a rosin modified resin such as rosin ester, rosin modified maleic acid resin and rosin modified phenol resin, other phenol resins, a petroleum resin, a ketone resin, an alkyd resin, a xylene resin, an indene-coumarone resin, a cellulose resin such as ethylcellulose and acetylcellulose, polyvinyl butyral resin, a vinyl chloride-vinyl acetate copolymer, a vinylidene chloride-acrylonitrile copolymer, a vinylidene chloride-vinyl chloride copolymer and a mixture of two or more of these.

The ink composition may further contain an effective amount of a surfactant to prevent the ink composition from being repelled on the writing surface and to increase the adhesiveness to the surface of the ink composition when writing. Any surfactant may be used, for example, a polyoxyethylene alkylether, a sorbitan fatty acid ester, an alkylammonium halide, and an alkylaryl sulfonate.

When necessary, the ink composition of the invention may further contain an effective amount of additional additives such as an antiseptic, e.g., sodium benzoate and potassium sorbate to improve the durability of the ink composition, and a plasticizer, e.g., dioctyl phthalate and tricresyl phosphate to control the hardness and appearance of writing formed.

The ink composition of the invention, when being applied onto an absorbent or pervious writing surface, provides a writing composed of inner portion of a first color and outer contour portions therearound of a second color, i.e., the composition successfully forms on the surface a distinct dichromatic writing, as set forth above. Furthermore, since the composition is an organic solution having the dyestuffs dissolved therein, it is used for writing without shaking, but also it causes no clogging of writing tip, thus the composition always permits to write well to provide a distinct and clear dichromatic writing.

Any device may be used for writing a polychromatic writing on an absorbent or pervious writing surface with the ink composition of the invention, and the composition is not restricted to any writing device when being applied to the surface. However, since the composition is an organic solution, as set forth above, a marking pen can be suitably used for writing with the composition, which marking pen comprises a tubular holder, an ink reservoir of a continuously porous structure composed of, for example, felt, foamed resin such as foamed polyurethane, a bundle of fibers or sintered resin powder, provided with in the holder, the reservoir being impregnated with an ink composition, and a writing tip mounted at the top of the holder so as to receive the composition from the reservoir.

The above is an important advantage of the present ink composition from the view point of simplifying the production steps and cost of marking pen for polychromatic writing, although such a structure is already known and has been in use for a conventional monochromatic ink composition including solvent-soluble dyestuffs. As set forth previously, it is difficult to use the above structure for a conventional polychromatic ink composition, since it contains powdery pigments which are insoluble and are dispersed in the ink composition. The pigments are adsorbed on the porous structure of ink reserir such as a bundle of fibers, but also they clog the writing tip, so that the composition is not supplied to the writing tip end in a sufficient amount for smooth writing to make a writing formed blurred and indistinctly dichromatic.

The ink composition of the invention may be prepared by any method known in the ink composition field. For example, the ink composition may be prepared by adding the first and the second dyestuffs to a mixture of the polar and nonpolar organic solvents and then by stirring the resulting mixture for a suffident period of time under heating if necessary to provide a uniform composition. However, in consideration of solubilities of the dyestuffs in each of the polar and the nonpolar organic solvents, the composition is preferably prepared as follows. At first, a first solution is prepared by dissolving the first dyestuff in the polar organic solvent and a second solution by dissolving the second dyestuff in the nonpolar organic solvent. Then the second solution is gradually added to the first solution followed by stirring the resulting mixture for a suffcent period of time under heating if necessary to provide a uniform composition.

The present invention will be more easily understood with reference to the following examples, which however are intended to illustrate the invention only and are not to be construed to limiting the scope of the invention, and in the examples quantities of components are expressed in parts by weight.

EXAMPLE 1

Victoria Blue F4R (C.I. Solvent Blue 2): 1
Oil Pink 312: 3
Ethanol: 20

Ethylcyclohexane: 76

This ink composition, when applied to paper, forms a writing composed of a blue inner portion and pink outer contour portions therearound.

EXAMPLE 2

Water Blue 9 (C.I. Acid Blue 9): 1.8
Oil Yellow 105: 2.2
Ethanol: 5.0
Ethyleneglycol monomethylether: 17.0
Acetophenone: 12.5
n-Heptane: 4.0
Xylene: 52.5
Rosine ester (Pencel A by Arakawa Kagaku Kogyo K.K.): 5.0

This ink composition, when applied to paper, forms a writing composed of a green inner portion and yellow outer contour portions therearound.

EXAMPLE 3

Orazole Red B (C.I. Solvent Red 7): 1
Oil Yellow 105: 2
n-Butyl acetate: 8
Xylene: 79
Petroleum resin (Nisseki Neopolymer by Nihon Sekiyu K.K.): 10

This ink composition, when applied to paper, forms a writing composed of a red-brown inner portion and yellow outer contour portions therearound.

EXAMPLE 4

Eosin (C.I. Acid Red 87): 4.0
Neozapon Blue FLE (C.I. Solvent Blue 55): 0.2
Ethyleneglycol monomethylether: 20.0
Xylene: 75.8
Petroleum resin (Alcon by Arakawa Kagaku Kogyo K.K.): 10.0

This ink composition, when applied to paper, forms a writing composed of a violet inner portion and blue outer contour portions therearound.

EXAMPLE 5

Oil Yellow 105: 2.2
Water Blue 9: 1.8
Ethyleneglycol monoethylether: 17.0
Ethyleneglycol: 12.5
Xylene: 61.5
Rosin ester (loc. cit.): 5.0

This ink composition, when applied to paper, forms a writing composed of a green inner portion and a yellow outer contour portions therearound.

EXAMPLE 6

Orazole Red B (C.I. Solvent Red 7): 1
Oil Yellow 105: 2
n-Butyl acetate: 3
Methyl isobutyl ketone: 5
Xylene: 79
Petroleum resin (loc. cit.): 10

This ink composition, when applied to paper, forms a writing composed of a red-brown inner portion and yellow outer contour portion therearound.

What is claimed is:

1. An ink composition for writing on an absorbent or pervious writing surface to form thereon a writing or marking composed of an inner portion of a first color with outer contour portions therearound of a second color, which composition comprises:
    a polar organic solvent,
    a nonpolar organic solvent which is miscible with the polar organic solvent,
    a first dyestuff which is soluble both in the polar organic solvent and a mixture of the polar organic solvent and the nonpolar organic solvent, but which is insoluble in the nonpolar organic solvent, and
    a second dyestuff which is soluble both in the nonpolar organic solvent and a mixture of the polar organic solvent and the nonpolar organic solvent, the second dyestuff being different in color from the first dyestuff,
    whereby the first dyestuff forms in conjunction with the second dyestuff the inner portion of the first color based on the first and the second dyestuffs, and the second dyestuff forms the outer contour portions of the second color based on the second dyestuff around the inner portion.

2. The ink composition as claimed in claim 1, wherein
    the polar organic solvent is at least one member selected from the group consisting of a monohydric alcohol, an aliphatic carboxylic acid ester, alicyclic carboxylic acid ester, aromatic carboxylic acid ester, an aliphatic ketone, alicyclic ketone and aromatic ketone, a polyhydric alcohol monoalkyl ether and monoalkyl ester;
    the nonpolar organic solvent is at least one hydrocarbon;
    the first dyestuff is at least one member selected from the group consisting of a water-soluble dyestuff and a spirit-soluble dyestuff; and
    the second dyestuff is at least one oil-soluble dyestuff.

3. The ink composition as claimed in claim 1 which includes a polyhydric alcohol as a component of the polar organic solvent.

4. The ink composition as claimed in claim 1 which further includes a resin soluble in the organic solvents.

5. The ink composition as claimed in claim 1 which comprises:
    2–50% by weight of the polar organic solvent,
    40–95% by weight of the nonpolar organic solvent,
    0.05–10% by weight of the first dyestuff, and
    0.05–10% by weight of the second dyestuff.

6. The ink composition as claimed in claim 5 which further includes not more than 30% by weight of the resin.

7. The ink composition as claimed in claim 1 which comprises:
    5–35% by weight of the polar organic solvent,
    50–90% by weight of the nonpolar organic solvent,
    0.1–5% by weight of the first dyestuff, and
    0.1–5% by weight of the second dyestuff.

8. The ink composition as claimed in claim 7 which further includes 5–20% by weight of the resin.

9. The ink composition as claimed in claim 1 which further includes an effective amount of at least one additives selected from the group consisting of a surfactant, an antiseptic and a plasticizer.

* * * * *